US011725970B2

(12) United States Patent
Collver et al.

(10) Patent No.: US 11,725,970 B2
(45) Date of Patent: Aug. 15, 2023

(54) FLUID METERING/MONITORING SYSTEM USING VIBRATION

(71) Applicant: ROMET LIMITED, Mississauga (CA)

(72) Inventors: Brent Collver, Oakville (CA); Frederick Joseph Maly, Jr., Oakville, MO (US)

(73) Assignee: ROMET LIMITED, Mississauga (CA)

( * ) Notice: Subject to any disclaimer, the term of this patent is extended or adjusted under 35 U.S.C. 154(b) by 0 days.

(21) Appl. No.: 17/515,827

(22) Filed: Nov. 1, 2021

(65) Prior Publication Data

US 2022/0136883 A1    May 5, 2022

Related U.S. Application Data

(60) Provisional application No. 63/109,008, filed on Nov. 3, 2020.

(51) Int. Cl.
*G01F 1/84* (2006.01)
(52) U.S. Cl.
CPC .......... *G01F 1/8468* (2013.01); *G01F 1/8459* (2013.01)
(58) Field of Classification Search
None
See application file for complete search history.

(56) References Cited

U.S. PATENT DOCUMENTS

| 5,756,898 A * | 5/1998 | Diatschenko | G01N 29/14 |
| | | | 73/592 |
| 6,601,005 B1 * | 7/2003 | Eryurek | G07C 3/00 |
| | | | 73/861.357 |
| 2009/0043530 A1 * | 2/2009 | Sittler | G01M 13/028 |
| | | | 702/141 |
| 2014/0269828 A1 | 9/2014 | Engelstad et al. | |

OTHER PUBLICATIONS

International Search Report dated Feb. 9, 2022 for Corresponding International PCT Patent Application No. PCT/CA2021/051547, 3 Pages.
Written Opinion dated Feb. 9, 2022 for Corresponding International PCT Patent Application No. PCT/CA2021/051547, 5 Pages.

* cited by examiner

*Primary Examiner* — Paul M. West
*Assistant Examiner* — Mark A Shabman

(57) ABSTRACT

A fluid monitoring system is provided, which includes at least one fluid vibration sensing unit to provide at least one fluid vibration signal from at least one location on a measuring chamber of a meter to be monitored. The system also includes one or more display units, and a control unit configured to be coupled to the at least one fluid vibration sensing unit and the one or more display units. The control unit is configured to detect a condition from the respective location using the at least one fluid vibration sensing unit and communicate to at least one or more display units to provide a display of the condition. A meter with a fluid monitoring system is also provided.

22 Claims, 4 Drawing Sheets

FLUID METERING/MONITORING SYSTEM USING VIBRATION

CROSS-REFERENCE

The present application claims priority to and the benefit of U.S. Provisional Application No. 63/109,008, filed 3 Nov. 2020, the entire contents of which are incorporated herein by reference, where permissible.

FIELD

The present disclosure relates to systems for metering and monitoring fluids using vibration, and more particularly relates to systems using inferential volume determination correlated from vibration, such as in the context of a meter for natural gas.

BACKGROUND

Metering systems are widely used to distribute and measure the distribution of fluids such as within a factory, plant, mill or other industrial or non-industrial environment, which environment is not limited to an indoor environment. One type of metering system relates to the distribution of natural gas (methane). Another type of system relates to the distribution of mixed gas, such as but not limited to natural gas and hydrogen gas. Other gases may also be distributed using a metering system. Other fluids, which may be a liquid, such as water, may be distributed using a metering system.

One of the functions of a metering system is to determine the volume of the fluid. A measuring chamber of a known volume may be used to assess the volume of the fluid as it flows. The flow rate or velocity may be measured either mechanically or electronically and compared to the area of the measuring chamber. However, particulates in natural gas can attach to internal components of the meter and create resistance mechanically, reducing their effectiveness as measuring components. It would be desirable to provide a method and system for determining the volume of fluid inferentially through sensors on the measuring chamber, and in particular through the use of one or more vibration sensors.

SUMMARY

According to a first aspect of the invention, a fluid monitoring system is provided which includes at least one fluid vibration sensing unit to provide at least one fluid vibration signal from at least one location on a measuring chamber of a meter to be monitored. The system also includes one or more display units, and a control unit configured to be coupled to the at least one fluid vibration sensing unit and the one or more display units. The control unit is configured to: detect a condition from the respective location using the at least one fluid vibration sensing unit; and communicate to at least one of the one or more display units to provide a display of the condition.

In an embodiment, the condition corresponds to a volume of fluid within or passed through the measuring chamber, as correlated from the vibration signal.

In an embodiment, the at least one location is an exterior surface of the measuring chamber.

In an embodiment, the control unit comprises a storage device, in which case, the control unit is further configured to control a logging of the condition to the storage device.

In an embodiment, the one or more display units comprise a communication interface to communicate the condition to a location remote from the meter.

In an embodiment, the at least one fluid vibration sensing unit comprises an accelerometer. In an embodiment, the system further includes at least one (signal) filtering unit or conversion unit to process data from the accelerometer.

In an embodiment, the at least one fluid vibration sensing unit is preferably configured to detect fluid vibration above a natural frequency of the measuring chamber. In an embodiment, the control unit is further configured to communicate the condition when the fluid vibration is detected to be above the natural frequency of the measuring chamber.

In an embodiment, the system further includes a pressure sensing unit to provide at least one fluid pressure signal from at least one location at the measuring chamber. In an embodiment in this case, the pressure sensing unit measures pressure within the measuring chamber (though a pressure sensor may be located externally) and the condition corresponds to a volume of fluid within or passed through the measuring chamber, as correlated from the vibration signal and the pressure signal.

In an embodiment, the system further includes a temperature sensing unit to provide at least one fluid temperature signal from at least one location at the measuring chamber (e.g. to measure temperature within the measuring chamber). In an embodiment in this case, the condition corresponds to a volume of fluid within or passed through the measuring chamber, as correlated from the vibration signal and the temperature signal.

In an embodiment, detecting a condition comprises comparing the vibration signal from the at least one sensing unit to a stored threshold. In an embodiment, the control unit is configured to communicate the condition when the fluid vibration is detected to be above the stored threshold. In an embodiment, the control unit is configured to actuate a control (which may be on or off the meter) when the fluid vibration is detected to be above the stored threshold. For example, without limitation, the control comprises a volume or flow rate restriction/reduction or shutoff.

According to a second aspect of the invention, a meter is provided with a fluid monitoring system such as in accordance with the first aspect including any embodiment thereof. For example, the meter having the fluid monitoring system includes at least one fluid vibration sensing unit to provide at least one fluid vibration signal from at least one location at a measuring chamber of a meter to be monitored. The meter also includes one or more display units, and a control unit configured to be coupled to the at least one fluid vibration sensing unit and the one or more display units. In an embodiment, the meter control unit is configured to: detect a condition from the respective location using the at least one fluid vibration sensing unit; and communicate to at least one of the one or more display units to provide a display of the condition. In an embodiment, the condition corresponds to a volume of fluid within or passed through the measuring chamber of the meter, as correlated from the vibration signal.

In an embodiment, the at least one location is on an exterior surface of the measuring chamber.

The meter's control unit may comprise a storage device, in which case, the control unit is further configured to control a logging of the condition to the storage device.

In an embodiment, the meter is coupled to a display unit via a communication interface to communicate the condition to a location remote from the meter.

In an embodiment, the at least one fluid vibration sensing unit may comprise an accelerometer. The meter may further include at least one filtering unit or conversion unit to process data from the accelerometer.

In an embodiment, the at least one fluid vibration sensing unit is preferably configured to detect fluid vibration above a natural frequency of the measuring chamber. In an embodiment, the control unit is further configured to communicate the condition when the fluid vibration is detected to be above the natural frequency of the measuring chamber.

In an embodiment, the meter further includes a pressure sensing unit to provide at least one fluid pressure signal from at least one location at the measuring chamber (e.g. measuring pressure in the measuring chamber). In an embodiment in this case, the condition may correspond to a volume of fluid within or passed through the measuring chamber, as correlated from the vibration signal and the pressure signal.

In an embodiment, the meter further includes a temperature sensing unit to provide at least one fluid temperature signal from at least one location at the measuring chamber (e.g. to measure temperature within the chamber). In an embodiment in this case, the condition corresponds to a volume of fluid within or passed through the measuring chamber, as correlated from the vibration signal and the temperature signal.

In an embodiment, detecting a condition may comprise comparing the vibration signal from the at least one sensing unit to a stored threshold. In an embodiment, the meter's control unit is configured to communicate the condition when the fluid vibration is detected to be above the stored threshold. In an embodiment, the control unit is configured to actuate a control (which may be on or off the meter) when the fluid vibration is detected to be above the stored threshold. For example, without limitation, the control may be a volume or flow rate restriction/reduction or shutoff.

Figure 1:
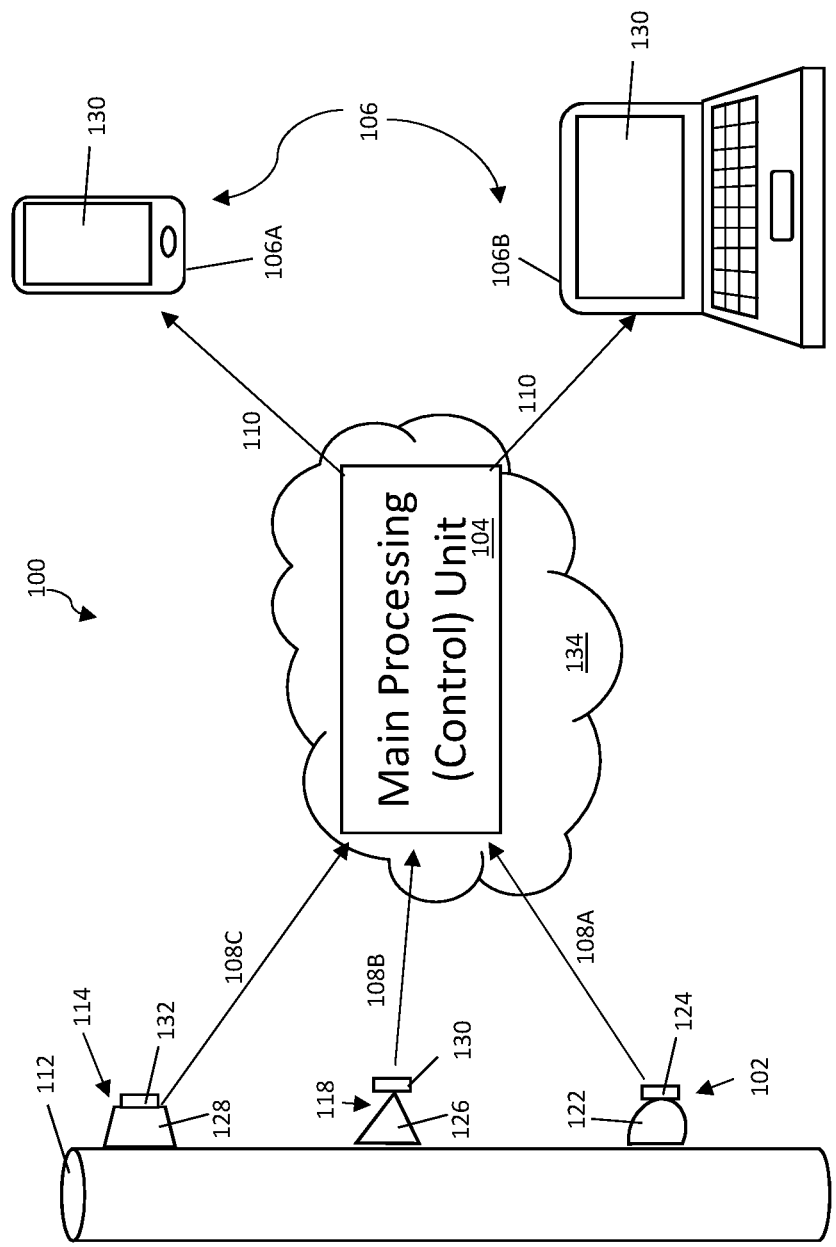
FIG. 1 is an illustration of a system for measuring volume of a fluid, including a measuring chamber and sensors in accordance with an example.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

The general inventive concepts described herein are not limited to any single context and may apply to various contexts or applications. In particular, while a natural gas context is described herein, a person of ordinary skill in the art will appreciate that other fluid distribution contexts may apply including other gases, including mixed gases, water and oils.

Natural gas or fossil gas is an odorless naturally occurring hydrocarbon gas mixture consisting primarily of methane, but can include varying amounts of other higher alkanes, and sometimes a small percentage of carbon dioxide, nitrogen, hydrogen sulfide, or helium. Natural gas is used as a source of energy for heating, cooking, electricity generation, fuel for vehicles, as well as other processes in various industries.

A measuring apparatus measures the flow of natural gas and may come in the form of a positive displacement meter or an inferential meter.

A positive displacement meter is a precision measuring instrument that is manufactured to tight tolerances. As natural gas flows into a meter, the natural gas fills and empties measuring chambers. The meter then counts the number of times this occurs and determines the volume of natural gas that flows through the meter.

An inferential meter is a precision measuring instrument that is also manufactured to tight tolerances. As natural gas flows into a meter, the natural gas flows through measuring chambers. The flow rate or velocity is measured either mechanically or electronically and compared to the area of the measuring chamber. Inferential meters, used in various industries, work by correlating sensor data to the size of a measuring chamber.

For both types of measuring systems, particulates in natural gas can attach to different internal components and create resistance. This resistance increases the amount of pressure required to operate the measuring system and therefore reduces the outlet pressure of the measuring system.

Vibration sensors can be used as a reliable and efficient means for determining a volume of fluid inferentially without reliance on internal components that can become soiled with particulates over time.

Measuring chambers have a natural frequency, which is altered when fluid flows through the measuring chamber. The difference in frequency together with other detected and known variables can be used to determine volume.

To accurately measure the volume of a fluid, the following parameters are used: speed of the fluid, volume of measuring chamber, pressure factor, temperature factor, and supercompressibility factor of the fluid. Volume of a fluid is expressed in cubic feet per second (f³/s), calculated from the following Equation 1:

$$\text{Corrected } CF = \text{Volume of Measurement Chamber} \times \frac{(\text{Gauge Pressure} + \text{Atmosphere})}{\text{Atmosphere Base}} \times \frac{(\text{Temperature} + 460° \text{ F.})}{(60° \text{ F.} + 460° \text{ F.})} \times \text{Supercompressibility Factor} \quad (1)$$

This can also be expressed in cubic meters per second (m³/s) where the volume of the chamber is in m³. Temperature may be represented in ° C. and pressure in PSI or an SI equivalent such as kilo Pascals (kPa) where 1 psi=6894.76 Pascals (or newton per square metre).

By detecting the vibration of the measuring chamber (above its natural frequency), speed of the fluid can be calculated (e.g. as a flow rate in f³/s or m³/s, etc.). With a detected pressure and temperature, and a known supercompressibility factor of the fluid being metered and known volume of the measuring chamber, the volume of the fluid (in f³/s or m³/s, etc.) is derivable using the above equation (or an equivalent such as using SI units).

By way of example, if gauge pressure is 2 PSIG, atmospheric pressure is 14.55, atmospheric base is 14.73, temperature is 60, the corrected CF is 1123 by Equation 1, as shown below.

$$\text{Corrected } CF = 1000 \text{ Uncorrect } CF \times$$
$$\frac{(2PSIG + 14.55)}{14.73} \times \frac{(60° \text{ F.} + 460° \text{ F.})}{(60° \text{ F.} + 460° \text{ F.})} \times \text{Supercompressibility Factor} =$$
$$1000 \text{ Uncorrected } CF \times 1.1236 \times 1 \times 1 = 1123.$$

CF 1123 is equivalent to about 31.79 cubic meters.

Table 1 below illustrates the effect on corrected CF as PSIG increments by 1.

TABLE 1

From 1 PSIG, Pressure increases 1 PSIG

| PSIG | Uncorrected CFH | Pressure Factor | Temperature Factor (F.) | Supercompressibity Factor | Corrected CFH |
|---|---|---|---|---|---|
| 1 | 1000 | 1.055669 | 1 | 1 | 1056 |
| 2 | 1000 | 1.123557 | 1 | 1 | 1124 |
| 3 | 1000 | 1.191446 | 1 | 1 | 1191 |
| 4 | 1000 | 1.259335 | 1 | 1 | 1259 |
| 5 | 1000 | 1.327223 | 1 | 1 | 1327 |
| 6 | 1000 | 1.395112 | 1 | 1 | 1395 |
| 7 | 1000 | 1.463001 | 1 | 1 | 1463 |
| 8 | 1000 | 1.530889 | 1 | 1 | 1531 |
| 9 | 1000 | 1.598778 | 1 | 1 | 1599 |
| 10 | 1000 | 1.666667 | 1 | 1 | 1667 |

Table 2 is an SI representation of Table 1:

TABLE 2

From 6.89476 kPa, Pressure increases 1 kPa

| kPa | Uncorrected CMH | Pressure Factor | Temperature Factor (F.) | Supercompressibity Factor | Corrected CMH |
|---|---|---|---|---|---|
| 6.89476 | 28.3168 | 1.055669 | 1 | 1 | 29.90254 |
| 13.78952 | 28.3168 | 1.123557 | 1 | 1 | 31.82808 |
| 20.68428 | 28.3168 | 1.191446 | 1 | 1 | 33.72531 |
| 27.57904 | 28.3168 | 1.259335 | 1 | 1 | 35.65085 |
| 34.4738 | 28.3168 | 1.327223 | 1 | 1 | 37.57639 |
| 41.36856 | 28.3168 | 1.395112 | 1 | 1 | 39.50194 |
| 48.26332 | 28.3168 | 1.463001 | 1 | 1 | 41.42748 |
| 55.15808 | 28.3168 | 1.530889 | 1 | 1 | 43.35302 |
| 62.05284 | 28.3168 | 1.598778 | 1 | 1 | 45.27856 |
| 68.9476 | 28.3168 | 1.666667 | 1 | 1 | 47.20411 |

Table 3 below illustrates the effect on corrected CF as temperature decreases by 5° F. and Table 4 is an SI equivalent.

TABLE 4

From 60 Degree F., Temperature Decreases 5 Degrees F.

| PSIG | Uncorrected CFH | Pressure Factor | Temperature Factor (F.) | Supercompressibity Factor | Corrected CFH |
|---|---|---|---|---|---|
| 1 | 1000 | 1 | 1.0097 | 1 | 1010 |
| 2 | 1000 | 1 | 1.0196 | 1 | 1020 |
| 3 | 1000 | 1 | 1.0297 | 1 | 1030 |
| 4 | 1000 | 1 | 1.0400 | 1 | 1040 |
| 5 | 1000 | 1 | 1.0505 | 1 | 1051 |
| 6 | 1000 | 1 | 1.0612 | 1 | 1061 |
| 7 | 1000 | 1 | 1.0722 | 1 | 1072 |
| 8 | 1000 | 1 | 1.0833 | 1 | 1083 |
| 9 | 1000 | 1 | 1.0947 | 1 | 1095 |
| 10 | 1000 | 1 | 1.1064 | 1 | 1106 |

TABLE 5

From 15.55556 Degree C., Temperature Decreases 2.77778 Degrees C.

| kPa | Uncorrected CMH | Pressure Factor | Temperature Factor (C.) | Supercompressibity Factor | Corrected CMH |
|---|---|---|---|---|---|
| 6.89476 | 28.3168 | 1 | 1.0097 | 1 | 28.59147 |
| 13.78952 | 28.3168 | 1 | 1.0196 | 1 | 28.87181 |
| 20.68428 | 28.3168 | 1 | 1.0297 | 1 | 29.15781 |
| 27.57904 | 28.3168 | 1 | 1.0400 | 1 | 29.44947 |
| 34.4738 | 28.3168 | 1 | 1.0505 | 1 | 29.7468 |
| 41.36856 | 28.3168 | 1 | 1.0612 | 1 | 30.04979 |
| 48.26332 | 28.3168 | 1 | 1.0722 | 1 | 30.36127 |
| 55.15808 | 28.3168 | 1 | 1.0833 | 1 | 30.67559 |
| 62.05284 | 28.3168 | 1 | 1.0947 | 1 | 30.9984 |
| 68.9476 | 28.3168 | 1 | 1.1064 | 1 | 31.32971 |

A person of ordinary skill in the art would appreciate that natural frequencies occur in every object, structure and system. Further, this natural frequency can be calculated for any particular object, structure or system. For example, the natural frequency of a simple oscillation can be defined as:

$f = \omega/2\pi$, where $\omega$ is the angular frequency of the oscillation, measured in radians/second. The following expression defines the angular frequency:

$\omega = \sqrt{k/m}$, where k is a spring constant and m is the mass. This means:

$$f = \frac{\sqrt{k/m}}{2\pi}.$$

By way of example, if k=100 N/m and m=1 kg, then the natural frequency is 1.6 Hz, which means that this system would oscillate 1.6 times per second.

To calculate the frequency of a steel tube or steel pipe the following formula is derived:

$f = (½\pi) \times 22.4 \times ((E \times I)/(\text{mass per length} \times L^4))^{0.5}$ where:
L=Length in inches (or cm)
E=Elastic Strength (Young's Modulus) in pound per foot/inches² (or MPascals or N/m²)
I=Stiffness [(0.049×(OD⁴−ID⁴)] in inches or cm
Mass Per Length=Pound of Mass/Inches (or kg/m)
By way of example, if L=5 metres⁴, E=200E9 Pa, I=0.000198 metres⁴, and Mass Per Length=132.05 Kg/m then the frequency is 78 Hz, which means that this system would oscillate 78 times per second. Using imperial units yields a same result.

Vibration sensors are capable of measuring the condition of vibrations of an object, structure or system. By positioning a vibration sensor on the measuring chamber, fluid flowing through the measuring chamber can be detected and measured.

In an embodiment, an appropriate vibration sensor is selected in accordance with the natural vibrational frequency of the measuring chamber and the sensitivity necessary for the metering application being carried out. For instance, an internal monitoring of fluid use within a plant for general operation monitoring may require a different sensitivity than a utility metering consumption of a chargeable fluid by an account holder.

In an embodiment, the vibration sensor is in communication with a processor or microprocessor that processes and adjusts the measurements and readings of the input vibration data including adjusting the sensitivity of the vibration sensor and correcting for errors. An example of a vibration sensor is an accelerometer.

Figure 4:
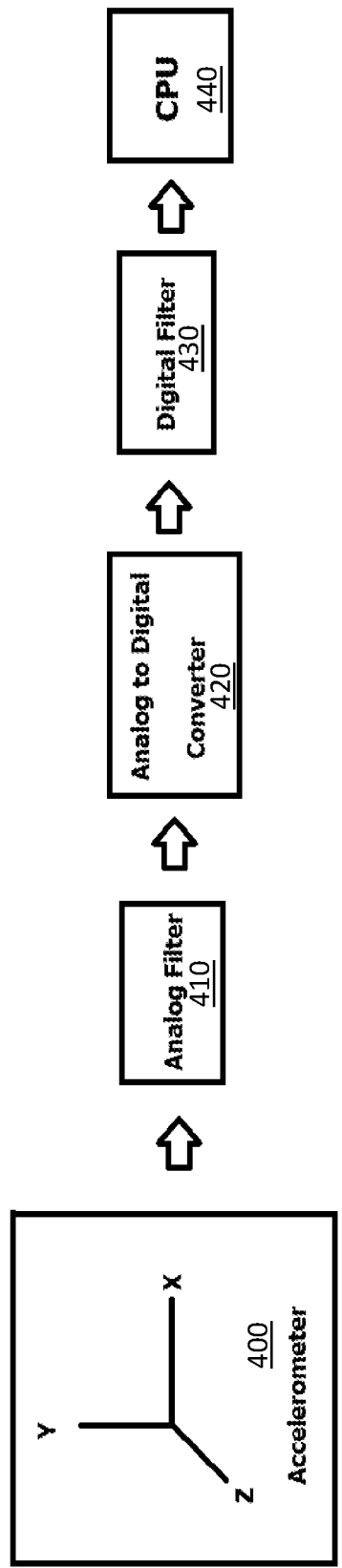
FIG. 4 is an illustration of one type of system for processing of accelerometer (vibration) data.

As illustrated in FIG. 4, data received from an accelerometer 400 may be processed through an analog filter 410, then converted using an analog to digital converter 420, then further processed through a digital filter 430 before being communicated to processor (CPU) 440. Various configurations and combinations of these filtering units and converting units are possible.

FIG. 1 shows an illustration of a fluid metering/monitoring system according to an example. The system 100 comprises at least one vibration sensing unit 102, main processing (control) unit 104, and one or more interface/display units 106. Vibration sensing unit 102 comprises vibration sensor 122 and processor unit 124. These components may be combined together in a single vibration transducer.

Pressure sensing unit 118 comprises pressure sensor 126 and processor unit 130. These components may be combined together in a single pressure transducer.

Temperature sensing unit 114 comprises temperature sensor 128 and processor unit 132. These components may be combined together in a single temperature transducer.

Preferably, the sensing units 102, 118, 114 are disposed on an outer surface of the measuring chamber 112.

In one embodiment, the sensing units 102, 118, 114 communicate (data flows 108A, 108B, 108C) with main processing (control) unit 104, which calculates the volume of the fluid. Volume determination may be carried out on a continuous basis, at intervals, on request triggered through the main processing (control) unit, or on detection in the system of a minimum threshold vibration above natural frequency.

The main processing (control) unit is in communication with one or more interface/display units 106 (see, e.g., 106A, 106B). All of the various devices herein (sensing units 114, 118, 122, main processing (control) unit 104, and interface/display units 106 (having respective displays 120) comprise respective communication components and may communicate via one or more protocols as is known. The networks 134 may include a public network such as the Internet. Main processing (control) unit, by way of example, may be provided as a cloud-based service, which may be configured as a service (SaaS) model.

It will be understood that main processing (control) unit 104 comprises a computing device having various components coupled for communication including at least some of: processor(s) (e.g. CPU, GPU, etc.), storage device(s), one or more communication subsystems or devices, display(s), input device(s), output device(s), etc. Displays may be touch or gesture enabled. Input devices may include a pointing device such as a mouse, a microphone, a camera, a keyboard, button(s), etc. Communication devices may provide any of wired or wireless communications and may be short or long range. Communication devices may couple to a location device such as to provide satellite based location services. Output devices may include a speaker, lights, vibration/haptic devices. The various components may be coupled via one or more communication buses or other structures.

The storage devices may store instructions and data for example, which instructions when executed configure the operation of the computing device. The instructions may define an operating system, applications, etc. The computing device for main processing (control) unit may be configured as a server or other device configuration.

Any of the processing units 124, 130, 132 herein may be computing devices such as described. Other computing devices (e.g. other processing unit types) may be used such as programmable logic devices, which may be field programmable such as field programmable gate array (FPGA), etc.

In one embodiment, the input data 108A communicated from the vibration sensing unit 102 to the main processing (control) unit 104 is raw vibration data. In another embodiment, processing unit 124 of the vibration sensing unit 102 preprocesses the vibration data from the vibration sensor and transmits input data 108A as preprocessed vibration data to the main processing (control) unit 104. For instance, the vibration data may be preprocessed to correct for error or to subtract a known vibration frequency or signature of the measuring chamber 112 when empty or at rest.

Likewise, the input data 108B communicated from the pressure sensing unit 118 to the main processing (control) unit 104 is raw pressure data. In another embodiment, processing unit 130 of the pressure sensing unit 118 preprocesses the pressure data from the pressure sensor and transmits input data 108B as preprocessed pressure data to the main processing (control) unit 104. For instance, the pressure data may be preprocessed to correct for error of the pressure sensing unit 118.

Likewise, the input data 108C communicated from the temperature sensing unit 114 to the main processing (control) unit 104 is raw temperature data. In another embodiment, processing unit 132 of the temperature sensing unit 114 preprocesses the temperature data from the temperature sensor and transmits input data 108C as preprocessed temperature data to the main processing (control) unit 104. For instance, the temperature data may be preprocessed to correct for error.

Main processing (control) unit 104 that receives input data 108A, 108B, 108C comprising vibration data, pressure data and temperature data processes (or further processes) that data to determine a volume measurement. This can then be output as output data 110 to one or more interface/display units 106 (e.g. devices 106A, 106B). This may be output to displays 130 on the units 106, for instance, in the form of a chart or graph or dashboard. In some embodiments, the output includes a tolled amount (cost) of the fluid distributed/consumed based on a rate per volume. The dashboard may further allow for configuration of the input to show fluid volume(s) or flow rate(s) over a given time period, or total consumption or distribution. Further, volume (or flow rate) thresholds may be set and alerts may be activated when those threshold amounts are surpassed. Standardized messages may be triggered depending on threshold. Alerts may be directed to separate devices than the interface/display units 106. For example, illuminated or auditory signals may be triggered on devices other than standard I/O devices. Further, volume (or flow rate) thresholds may be used to control consumption, such as by permitting other controls to be actuated (e.g. volume or flow rate restriction/reduction or shutoff) when threshold amounts are surpassed. Thresholds may be preset, or they may be user-configurable and/or configurable by the supplier of the fluid.

Further, vibration, pressure and temperature data (in raw and/or preprocessed form) may be displayed on the units 106. These data streams may also have thresholds and may trigger alerts or messaging if their thresholds are surpassed. These data streams may be used, for example, for operational or process controls apart from the volume determination (e.g. unsafe operating condition or leak detection).

Figure 2:
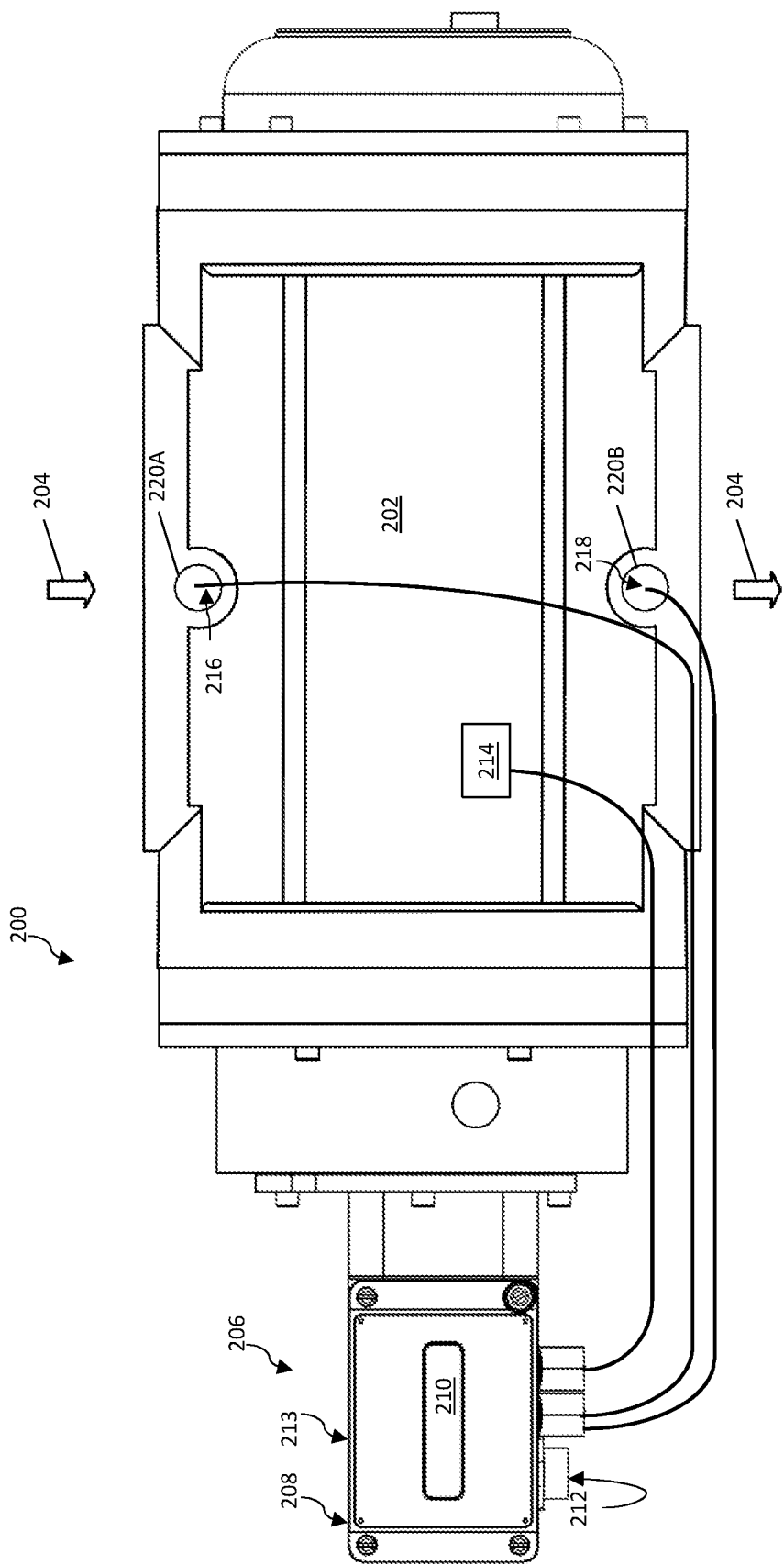
FIG. 2 is a gas metering unit in accordance with an example.

FIG. 2 is an illustration of a gas metering system 200 in accordance with an example. Gas metering system 200 is a positive displacement (rotary) meter comprising a metering chamber 202 housing cooperating impellers (not shown) that are driven by a flow of gas through the chamber 202 in the direction of the arrows 204. (It will be noted that meters—including gas meters—other than rotary meters are also included in the scope of the present disclosure.) At one side (end) of the metering system 200 there is mounted to the chamber 202 a processing system 206. Processing system 206 houses a processing unit 208, a display 210 and a communications subsystem 212 as well as a storage device 213 (e.g. memory). Processing unit 208 is coupled to receive: vibration sensor data from a vibration sensor 214 mounted on metering chamber 202; pressure data from one or more pressure sensors 216 mounted within metering chamber 202 and temperature data from a temperature sensor 218 mounted within metering chamber 202. Metering chamber 202 is configured with sensor ports 220A and 220B. In an embodiment, processing unit is configured (e.g. via instructions) to perform a method to determine flow rate using vibration data. In an embodiment any of the vibration data, pressure data, temperature data and flow rate is displayable via display 210. In an embodiment, any of the vibration data, pressure data, temperature data and flow rate is communicable via communications subsystem 212. The communications subsystem may communicate from any one or more of wired and wireless components. In an embodiment, processing system 206 is coupled to a remote computing device, for example any of main processing unit 104 and devices 130. Thus processing system 206 is configurable to provide raw and/or processed data for use to communicate information to end users of devices 130.

Figure 3:
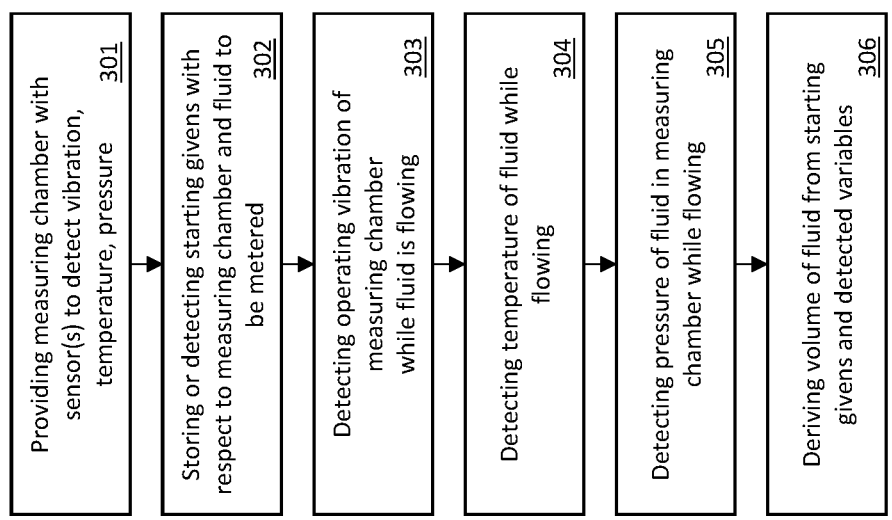
FIG. 3 is a flow diagram of a method for measuring volume of a fluid in accordance with an example.

FIG. 3 illustrates a basic process flow according to one embodiment.

A measuring chamber is provided 301. The measuring chamber has sensor units to detect vibration, temperature and pressure.

The method includes starting from several givens 302: known volume of measuring chamber; known (or detected) resting natural frequency (vibration) of the measuring chamber; known (or detected) atmospheric (or resting chamber) temperature and pressure; and known supercompressibility factor of the type of fluid being supplied to the measuring chamber.

Several other variables are detected using sensors: operating vibration while fluid is flowing 303; operating temperature while fluid is flowing 304; and operating pressure while fluid is flowing 305.

Flow rate of the fluid is derived from delta between vibration detected and natural frequency. From this, and in combination with the other givens and detected variables, volume of fluid is derived 306 based on Equation 1.

In addition to computing device aspects, a person of ordinary skill will understand that computer program product aspects are disclosed, where instructions are stored in a non-transitory storage device (e.g. a memory, CD-ROM, DVD-ROM, disc, etc.) to configure a computing device to perform any of the method steps or aspects described herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "include" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of the features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A fluid monitoring system comprising:
    at least one fluid vibration sensing unit to provide at least one fluid vibration signal from at least one location on a measuring chamber of a meter to be monitored, wherein the at least one fluid vibration sensing unit is configured to detect fluid vibration above a natural frequency of the measuring chamber;
    one or more display units;
    a control unit configured to be coupled to the at least one fluid vibration sensing unit and the one or more display units;
    wherein the control unit is configured to:
        detect a minimum threshold fluid vibration above natural frequency using the at least one fluid vibration signal; and in response to detection of the minimum threshold fluid vibration above the natural frequency:

determine a condition from the respective location using the at least one fluid vibration signal, the condition comprising a measure of a volume of a fluid within or passing through the measuring chamber, as correlated from the at least one vibration signal; and communicate to at least one of the one or more display units to provide a display of the condition.

2. The system of claim 1, wherein determining the volume of fluid within or passed through the measuring chamber is further responsive to a measure of temperature or pressure or both temperature and pressure within the measuring chamber.

3. The system of claim 1, wherein the at least one location is on an exterior surface of the measuring chamber.

4. The system of claim 1, wherein the control unit comprises a storage device and wherein the control unit is further configured to control a logging of the condition to the storage device.

5. The system of claim 1, wherein the one or more display units comprise a communication interface to communicate the condition to a location remote from the meter.

6. The system of claim 1, wherein the at least one fluid vibration sensing unit comprises an accelerometer.

7. The system of claim 6, further comprising at least one filtering unit or conversion unit to process data from the accelerometer.

8. The system of claim 1, further comprising a pressure sensing unit to provide at least one fluid pressure signal from at least one location on the measuring chamber.

9. The system of claim 8, wherein the volume of fluid within or passed through the measuring chamber is correlated from the vibration signal and the pressure signal.

10. The system of claim 1, further comprising a temperature sensing unit to provide at least one fluid temperature signal from at least one location on the measuring chamber.

11. The system of claim 10, wherein the volume of fluid within or passed through the measuring chamber is correlated from the vibration signal and the temperature signal.

12. The system of claim 1, wherein determining a condition comprises comparing the vibration signal from the at least one sensing unit to a stored threshold.

13. The system of claim 12, wherein the control unit is configured to at least one of: communicate the condition when the fluid vibration is detected to be above the stored threshold; and actuate a control when the fluid vibration is detected to be above the stored threshold.

14. The system of claim 13, wherein the control is a volume or flow rate restriction or shutoff.

15. A meter with a fluid monitoring system, wherein the fluid monitoring system comprising:

at least one fluid vibration sensing unit to provide at least one fluid vibration signal from at least one location on a measuring chamber of the meter, wherein the at least one fluid vibration sensing unit is configured to detect fluid vibration above a natural frequency of the measuring chamber;

one or more display units;

a control unit configured to be coupled to the at least one fluid vibration sensing unit and the one or more display units;

wherein the control unit is configured to:

detect a minimum threshold fluid vibration above natural frequency using the at least one fluid vibration signal; and in response to detection of the minimum threshold fluid vibration above the natural frequency:

determine a condition from the respective location using the at least one fluid vibration signal, the condition comprising a measure of a volume of a fluid within or passing through the measuring chamber, as correlated from the the at least one vibration signal; and communicate to at least one of the one or more display units to provide a display of the condition.

16. The meter of claim 15, wherein to determine the volume of fluid within or passed through the measuring chamber is further responsive to a measure of temperature or pressure or both temperature and pressure within the measuring chamber.

17. The meter of claim 15, wherein the at least one location is on an exterior surface of the measuring chamber.

18. The meter of claim 15, wherein at least one of:

the control unit comprises a storage device and wherein the control unit is further configured to control a logging of the condition to the storage device;

the one or more display units comprise a communication interface to communicate the condition to a location remote from the meter; and the at least one fluid vibration sensing unit comprises an accelerometer.

19. The meter of claim 15, further comprising a pressure sensing unit to provide at least one fluid pressure signal from at least one location on the measuring chamber, and wherein the condition comprising the volume of fluid within or passed through the measuring chamber is correlated from the vibration signal and the pressure signal.

20. The meter of claim 15, further comprising a temperature sensing unit to provide at least one fluid temperature signal from at least one location on the measuring chamber, and wherein the condition comprising the volume of fluid within or passed through the measuring chamber is correlated from the vibration signal and the temperature signal.

21. The meter of claim 15, wherein the control unit is configured to actuate a control when a fluid vibration is detected to be above a stored threshold.

22. The meter of claim 21, wherein the control is a volume or flow rate restriction or shutoff.

* * * * *